United States Patent [19]
Sims

[11] B 3,983,435
[45] Sept. 28, 1976

[54] STATOR ASSEMBLY FORMED OF FLAT, STRIP MATERIAL

[75] Inventor: Marion W. Sims, South Whitley, Ind.

[73] Assignee: General Electric Company, Fort Wayne, Ind.

[22] Filed: Nov. 5, 1974

[21] Appl. No.: 521,044

[44] Published under the second Trial Voluntary Protest Program on February 24, 1976 as document No. B 521,044.

[52] U.S. Cl. ............................... 310/259; 310/42; 310/216; 310/217; 310/218
[51] Int. Cl.² ...................... H02K 1/06; H02K 1/12
[58] Field of Search ............. 310/42, 116, 117, 118, 310/254, 256, 258, 259

[56] References Cited
UNITED STATES PATENTS

| | | | |
|---|---|---|---|
| 1,255,606 | 2/1918 | Hensley | 310/216 X |
| 2,236,291 | 3/1941 | Kilbourne | 310/218 |
| 2,351,316 | 6/1944 | Borden | 310/216 X |
| 2,516,140 | 7/1950 | Nahman | 310/216 X |
| 2,913,603 | 11/1959 | Carlson | 310/218 X |
| 3,064,147 | 11/1962 | Porter et al. | 310/216 X |
| 3,339,132 | 8/1967 | Schafft | 310/216 X |
| 3,591,819 | 7/1971 | Laing | 310/217 |

Primary Examiner—Mark O. Budd
Attorney, Agent, or Firm—Joseph E. Papin

[57] ABSTRACT

A stator assembly for a dynamoelectric machine has a yoke member formed of a continuous strip of ferromagnetic material with a generally cylindric inner surface. A plurality of spaced teeth are provided extending axially along and inwardly from the inner surface of the yoke member and having inner ends which define a bore for receiving a rotor member. Each of the teeth includes a plurality of axially and inwardly extending ferro-magnetic flat segments of ferro-magnetic strip material and connecting portions respectively positioned between adjacent ones of the teeth. Each of the connecting portions is formed of a ferro-magnetic strip material and has leg elements which respectively form parts of the adjacent ones of the teeth and a connecting element which extends between the leg elements.

9 Claims, 13 Drawing Figures

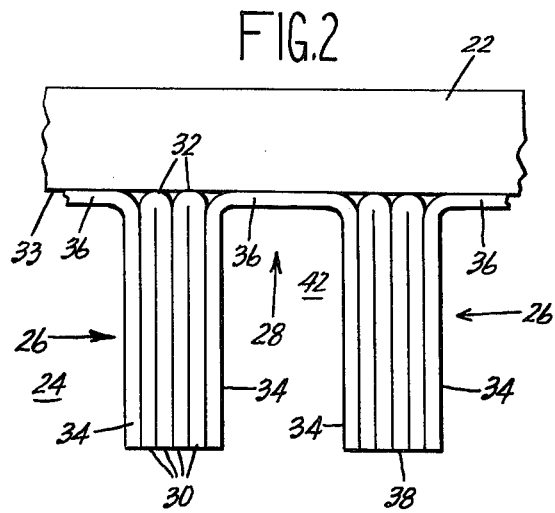
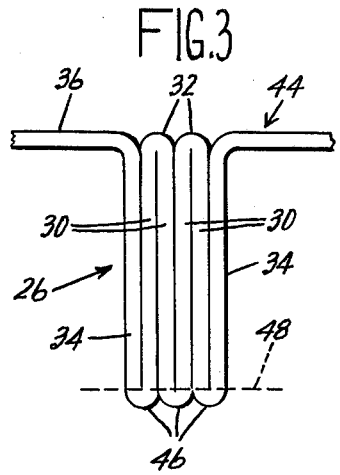
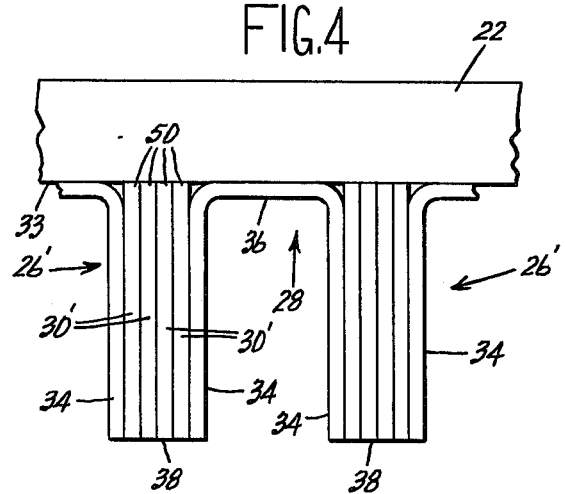
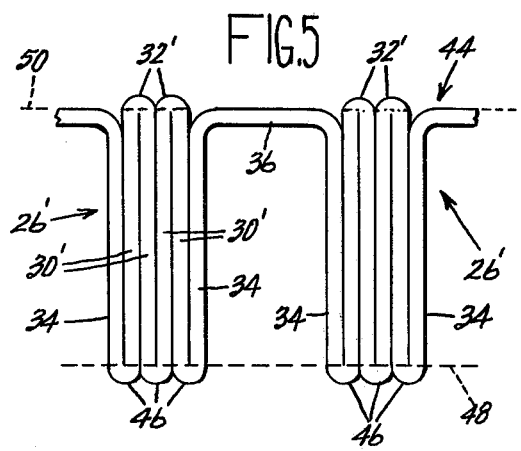
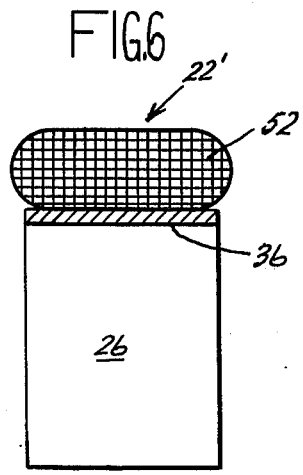
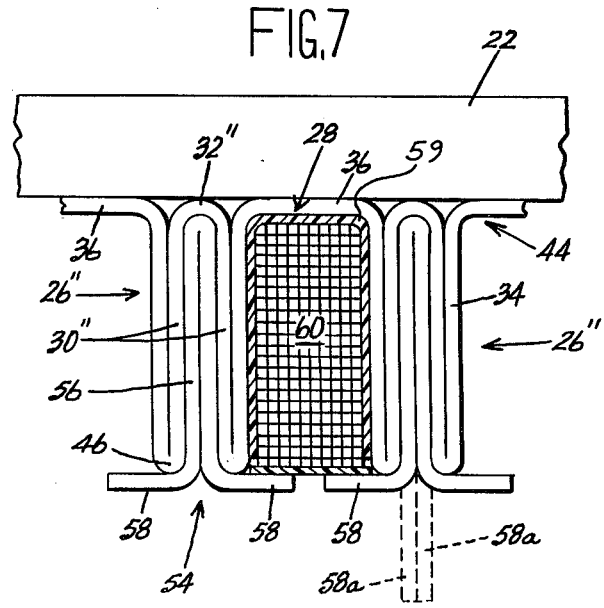

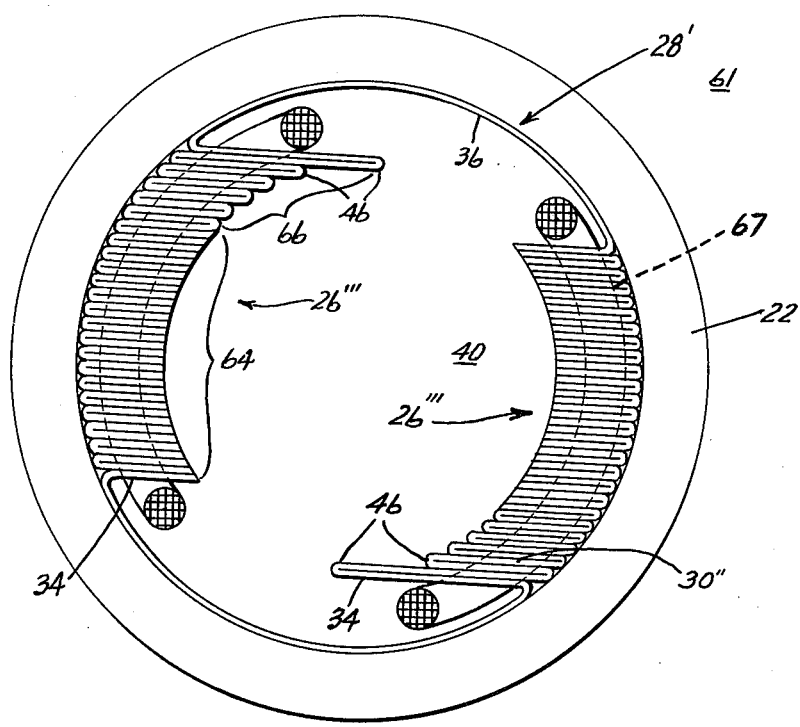
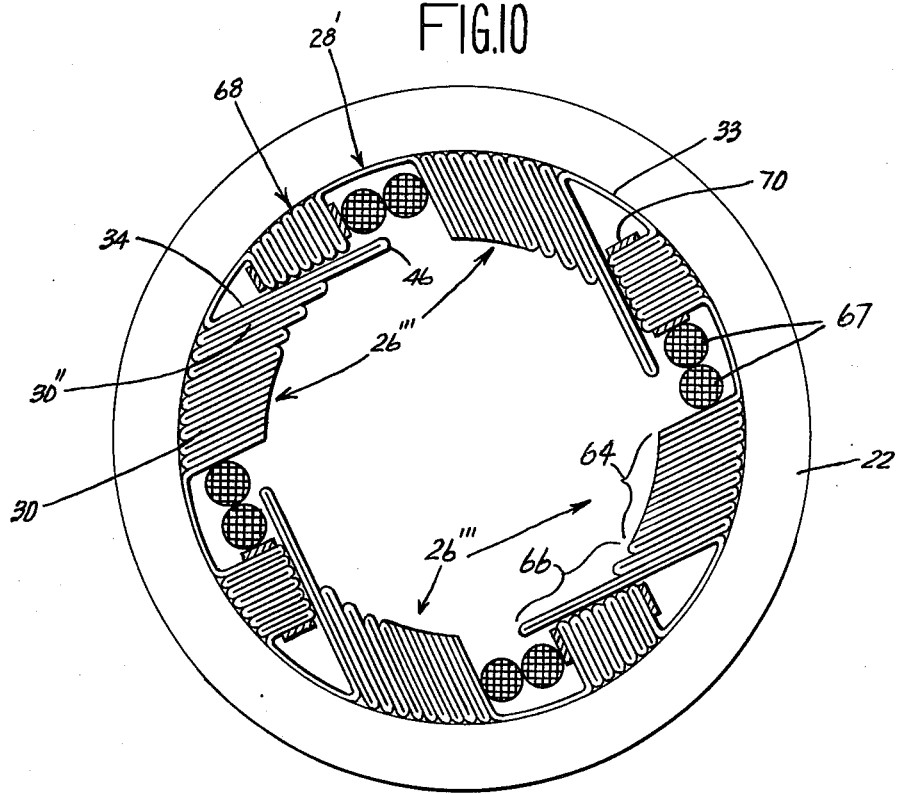

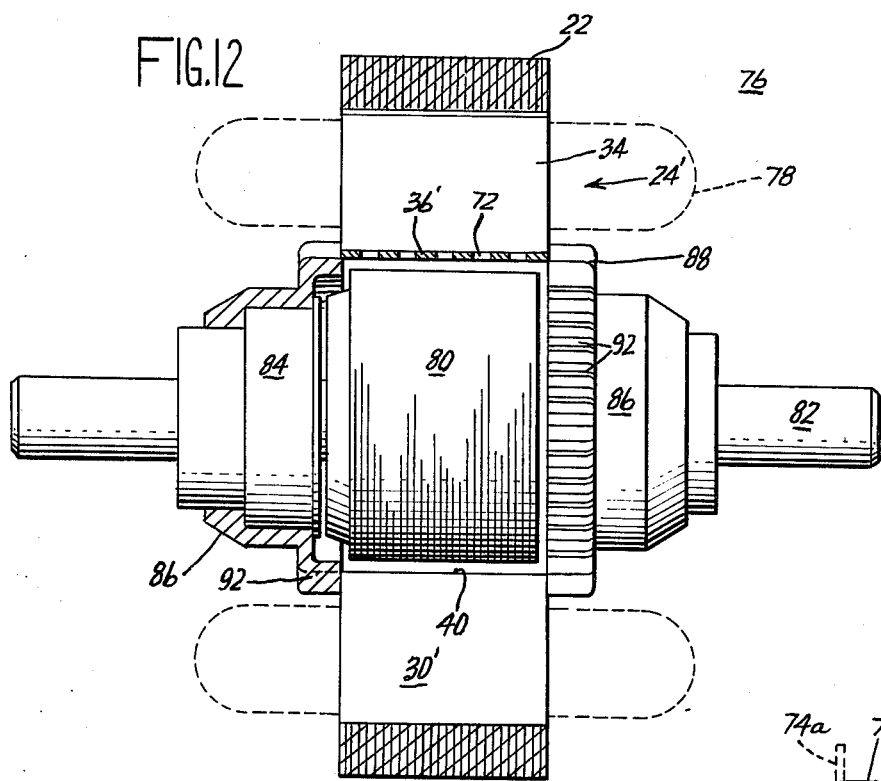
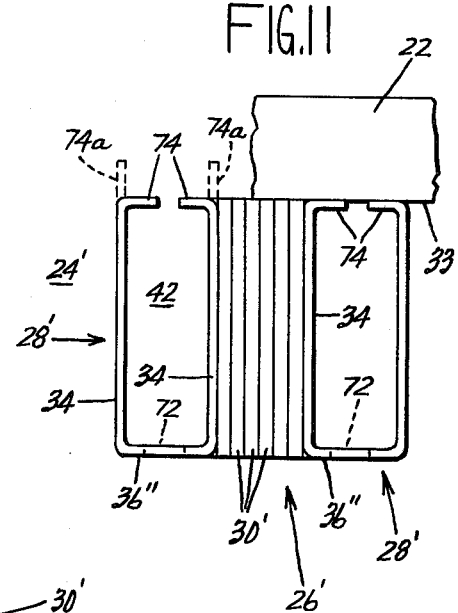
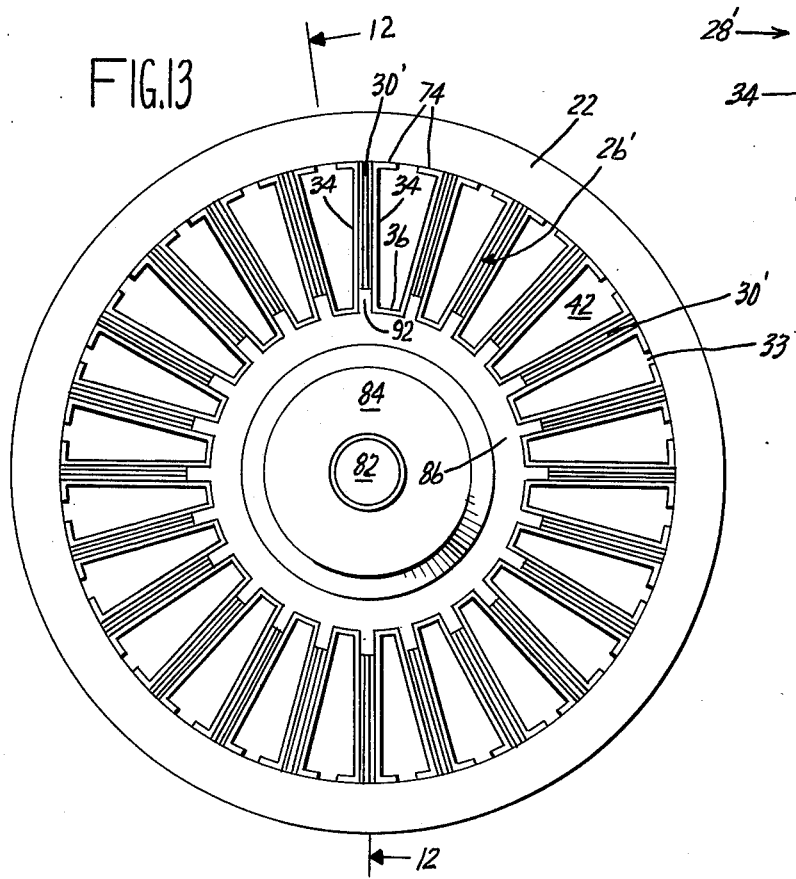

STATOR ASSEMBLY FORMED OF FLAT, STRIP MATERIAL

CROSS REFERENCE TO RELATED APPLICATION

A related application is Ser. No. 521,047 filed Nov. 5, 1974 of Allen A. Brammerlo assigned to the assignee of the present application. Also my applications Ser. No. 521,045 and Ser. No. 521,046 both filed Nov. 5, 1974, are related applications and are assigned to the assignee of the present application. All of these related applications are incorporated herein by reference.

BACKGROUND OF THE INVENTION

This invention relates generally to dynamoelectric machines and more particularly to a stationary or stator assembly therefor and a method of forming a stationary assembly for a dynamoelectric machine.

In the past, dynamoelectric machines were provided with stationary assemblies, such as stator assemblies or stator core members, which were conventionally formed of a stacked plurality of relatively thin laminations of sheet magnetic steel, the core having a central bore for receiving a notatable assembly or rotor member. Such laminations were conventionally formed in a punch press operation from a strip of low carbon iron or magnetic steel, there being considerable scrap remaining as the result of punching the laminations from the strip and punching the winding slots.

A two-pole dynamoelectric machine stator structure formed of flat strips of magnetic material is shown in U.S. Pat. No. 2,764,802 which was assigned to the assignee of the present application. Dynamoelectric machine pole pieces formed of a folded flat strip of magnetic material have also been known which may be suitable for small DC motors, but would not be expected to have the efficiency required of larger machines.

It is accordingly an object of the invention to provide an improved stationary or stator assembly for a dynamoelectric machine.

Another object of the invention is to provide an improved, stationary or stator assembly for a dynamoelectric machine which is generally scrapless.

A further object of the invention is to provide an improved stationary or stator assembly for a dynamoelectric machine which is formed from flat, strip ferromagnetic material.

SUMMARY OF THE INVENTION

In general and in one form of the invention, a stator assembly for a dynamoelectric machine is provided with a yoke member formed of a first strip of ferromagnetic material and having an inner surface. A plurality of teeth extend generally axially along and inwardly from the inner surface and have inner ends defining a bore. The teeth are formed from a second strip of ferro-magnetic material and have all parts thereof disposed generally within a region bounded by the inner surface, and each of the teeth have a plurality of axially and inwardly extending ferro-magnetic flat segments. The second strip of ferro-magnetic material also provides connecting portions respectively positioned between adjacent teeth.

Also in general, a stator assembly in one form of the invention for a dynamoelectric machine is provided with a yoke member formed of a first strip of ferromagnetic material and having an inner surface. A plurality of teeth are spaced around the inner surface and formed from a second strip of ferro-magnetic material and having all parts thereof disposed generally within a region bounded by the inner surface. The teeth have inner ends defining a bore, and spaces between adjacent teeth define winding slots therebetween. Connecting portions are positioned between the adjacent teeth, and the teeth and connecting portions are continuously formed from the second strip of ferro-magnetic material.

Further in general and in one form of the invention, a stator assembly for a dynamoelectric machine is provided with a yoke member formed of a continuous strip of ferro-magnetic material having an inner surface facing toward a bore, and a plurality of spaced polar regions define structures extending generally axially along and inwardly from the inner surface and having inner ends defining the bore. A first portion of the polar region defining structure is integrally joined by folds at the bore to establish a first reluctance characteristic, and a second portion of the polar region defining structure has edges at the bore to establish a second reluctance characteristic. The reluctance characteristic of the polar regions are determined at least in part by the presence and absence of the folds.

Still further and also in general, a stator assembly in one form of the invention for a dynamoelectric machine is provided with a yoke member formed of a continuous strip of ferro-magnetic material and having an inner surface facing toward a bore. A plurality of spaced teeth extend generally axially along and inwardly from the inner surface and have inner ends defining the bore. Each of the teeth have a plurality of generally axially and inwardly extending ferro-magnetic flat segments. Connecting portions are respectively positioned between adjacent ones of the teeth, and each of the connecting portions have leg elements respectively forming parts of adjacent teeth with the connecting portions being adjacent the bore. The teeth and connecting portions provide coil winding slots open adjacent the yoke.

The subject matter which I regard as my invention is particularly pointed out and distinctly claimed in the concluding portion of this specification. The invention itself, however, together with the above-mentioned and other features and objects of this invention and the manner of attaining them will become more apparent and the invention itself will be better understood by reference to the following description of an embodiment of the invention taken in conjunction with the accompanying drawings.

BRIEF DESCRIPTION OF THE DRAWINGS

FIG. 2 is a fragmentary side view showing two teeth of the stator assembly of FIG. 1;

FIG. 3 is a fragmentary side view useful in describing a method of forming the teeth of FIG. 2;

FIG. 4 is a fragmentary side view showing another form of teeth usable in the stator assembly of FIG. 1;

FIG. 5 is a fragmentary side view useful in describing a method of forming the teeth of FIG. 4;

FIG. 6 is a cross-sectional view of another form of yoke member;

FIG. 7 is a fragmentary side view showing another form of teeth with tip members respectively associated therewith;

FIG. 9 is an end view showing a modified embodiment of the invention that is of particular utility in shaded pole motors;

FIG. 10 is an end view showing a further modified embodiment, also particularly useful as part of a shaded pole motor;

FIG. 11 is a fragmentary view showing another form of teeth;

FIG. 12 is a side view, partly in cross-section and partly broken away, showing a motor incorporating the teeth shown in FIG. 11, and also incorporating a bearing structure cooperating with the teeth; and FIG. 13 is an end view of the motor shown in FIG. 12.

Corresponding reference characters indicate corresponding parts throughout the several views of the drawings.

The exemplifications set out herein illustrate the preferred embodiments of the invention in one form thereof, and such exemplifications are not to be construed as limiting in any manner the scope of the invention.

DESCRIPTION OF THE PREFERRED EMBODIMENTS

Figure 1:
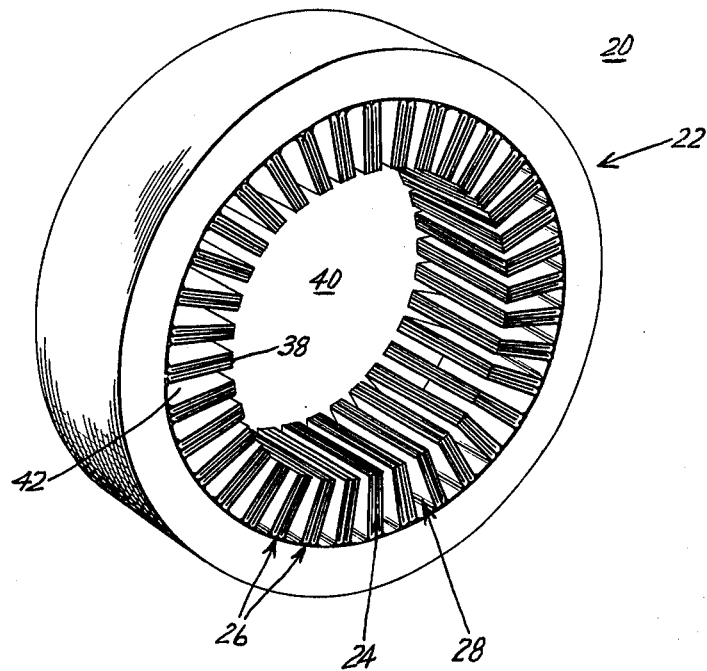
FIG. 1 is a perspective view of a dynamoelectric machine stator assembly incorporating one embodiment of the invention.

Referring now to FIGS. 1 and 2 of the drawings in detail, there is shown a stationary assembly or stator assembly, generally indicated at 20 for a dynamoelectric machine, and the stator assembly has a yoke member 22 and a plurality of pole structures or polar region defining structures such as 24. Yoke member 22 is preferably formed from an elongate, edge-wise wound strip of relatively thin, ferro-magnetic material, such as magnetic steel or iron however, as discussed hereinafter, the yoke member may also be formed from ferro-magnetic wire or the like.

A polar region defining structure 24 comprises a plurality of equally-spaced, axially and radially inwardly extending pole or tooth portions 26 respectively connected by a plurality of connecting portions 28. Each of pole portions or teeth 26 comprises a plurality of contiguous, axially and inwardly extending ferromagnetic flat segments or elements 30 formed of relatively thin, flat ferro-magnetic material. In the embodiment illustrated in FIG. 2, adjacent pairs of elements 30 are respectively integrally joined by a plurality folds 32 which engage magnetically an inner surface 33 of yoke member 22, and the teeth are disposed within a region bounded by inner surface 33 circumferentially. Thus, inner surface 33 forms a radial boundary for teeth 26 but not an axial boundary. Therefore, if desired, teeth 26 could extend further than inner surface 33 in an axial direction.

Each of connecting portions 28 comprise a generally U-shaped member formed of relatively thin, flat, strip ferro-magnetic material having a pair of leg elements or legs 34 and an integral connecting bight or element 36 which engages magnetically inner surface 33 of yoke member 22. Leg elements 34 of connecting portions 28 respectively are contiguous to facing ferro-magnetic flat segments 30 of adjacent pole portions 26 and respectively form a part of pole portions 26. The inner edges of ferro-magnetic flat segments 30 and leg elements 34 form a plurality of inner ends 38 of pole portions 26 which define a generally cylindric bore 40 for receiving a rotor member (not shown). It will be seen that adjacent pole portions or teeth 26 respectively define a plurality of winding slots 42 therebetween.

Connecting portion 28 may be a non-magnetic spacer to separate teeth 26, but preferably it is a magnetic material. Alternatively, teeth 26 could be bonded to yoke 22 without any spacers or connecting portions 28. Pole portions 26 are preferably insulated from yoke 22 to reduce eddy current losses, however, pole portion 26 and yoke 22 should be as close together as possible to minimize reluctance to the passage of magnetic flux.

Referring now to FIG. 3, pole structure 26 may be formed by folding an elongate strip 44 of ferro-magnetic material at spaced intervals generally along its length so as to form a plurality of upper folds or bends 32 and a plurality of lower folds or bends 46 thereby to generally constitute pole portions 26. Lower folds 46 are then removed (e.g. by milling or other suitable machining process or operation) as shown by the dashed line 48, either before or after positioning elongate strip 44 with its folded pole portions or teeth 26 in engagement with inner surface 33 of yoke 22. However, there are advantages to performing the removal operation after elongate strip 44 and yoke 22 are assembled. For example, strip 44 affords a stronger structure with folds 46 intact while being assembled with yoke 22, and the removal operation can then also be used to establish the proper size of bore 40.

Referring now to FIG. 4 in which like components are indicated by like reference numerals and similar components by primed reference numerals, a plurality of portions or teeth 26' are respectively generally constituted a plurality of separate, contiguous ferro-magnetic flat segments 30' formed of a separate relatively thin, flat strip of ferro-magnetic material and having their inner edges 50 abutting inner surface 33 of yoke member 22.

Referring now to FIG. 5, the pole structure of FIG. 4 may be formed by folding elongate strip 44 at spaced intervals to form pole portions or teeth 26' having a plurality of upper folds or bends 32' and lower bends 46, and upper bends 32' project above connecting portions 36. Lower folds 46 are removed by a suitable machining process, as shown by dashed line 48 and as mentioned above, and upper folds 32' are likewise removed flush with the upper surface of connecting elements 36, as shown by dashed line 50, thereby providing a plurality of separate ferro-magnetic flat segments 30'.

Alternatively, the embodiment shown in FIG. 4 may be provided by assembling precut, generally U-shaped connecting portions 28 and rectangular ferro-magnetic flat segments 30'.

Referring now to FIG. 6, a yoke member 22' may be formed of a plurality of turns 52 of filamentary ferro-magnetic material, such as iron wire or the like, as previously mentioned.

Referring now to FIG. 7, a plurality of pole portions or teeth 26" and connecting portions 28 may be integrally formed from strip 44 with a plurality of top folds 32" and bottom folds or bends 46 remaining in the finished structure, as shown. In this embodiment, a tooth tip member 54 is provided for each of pole portions 26". Each tooth tip member 54 is formed from an elongate, relatively thin, flat strip of ferro-magnetic material and has a folded center portion 56 positioned between ferro-magnetic flat segments or lamination elements 30", and projection elements or distal ends 58 of the folded center portion respectively extend outwardly therefrom so as to generally define bore 40. It will be seen that adjacent projecting elements 58 of tooth tip member 54 partially close winding slots 42 in which a field winding 60 and insulation 59 is placed, as shown. Projecting portions 58 of tooth tip members 54 may initially form extensions of folded center portion 56, as shown in phantom at 58a in FIG. 7. After windings 60 have been positioned in slots 42 between pole portions 26", as by winding or insertion or the like as is well known in the art, projecting portions 58a are folded to their positions as shown in solid lines at 58 in FIG. 7, thereby partially to close slots 42 and to compact windings 60 therein.

Figure 8:
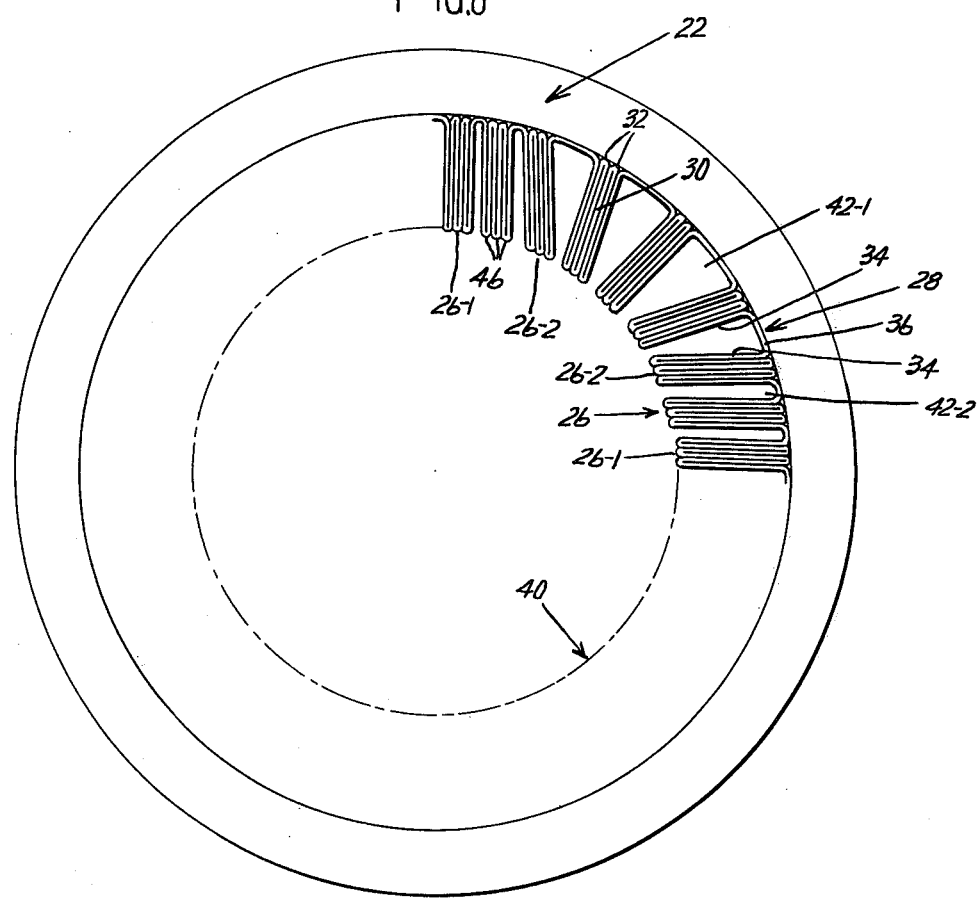
FIG. 8 is an end view of a dynamoelectric machine stator assembly embodying the invention in another form.

Referring now to FIG. 8, pole portions or teeth 26, which may take any of the forms shown in FIGS. 2, 4 and 7 as described above, may be arranged with certain pole portions, such as pole portions 26—1, extending generally radially inwardly and other pole portions, such as those indicated at 26—2 extending generally tangentially to an imaginary circle concentric with bore 40. Further, teeth 26 are unequally spaced thereby to provide certain slots 42—1 which are wider than certain other slots 42—2, the resulting assembly providing a graded slot stator wherein the slots are predeterminately sized to accomodate the desired or predetermined number of turns of the coils to be respectively positioned therein.

Referring now to FIG. 9, there is shown a two-pole, shaded pole stator assembly in one form of the invention and generally indicated at 61. Here each of polar region defining structures or portions 26''' comprises a first group 64 of ferro-magnetic flat segments 30 of the type shown in FIG. 2, and a second group 66 of ferro-magnetic flat segments 30" of the type shown in FIG. 7 in which adjacent flat segments are integrally joined by bottom folds 46. Conventional field coils 67 respectively embrace polar region defining portion 26'''. The second group 66 of folded ferro-magnetic flat segments 30" provides the shading function by reason of circulating currents within the laminations of flat segments 30".

Referring now to FIG. 10 in which is shown a four-pole, shaded pole stator assembly in one form of the invention, a plurality of polar region defining structures or portions 26''' are again provided having first and second groups 64, 66 of lamination segments, group 64 comprising lamination elements or ferro-magnetic flat segments 30 of the type shown in FIG. 2 and group 66 comprising ferro-magnetic flat segment 30" of the type shown in FIG. 7 including bottom folds 46. Here, in order to provide additional shading action, connecting portions 28' have a plurality of integrally folded sections 68 provided therein thus forming ferro-magnetic flat segments which extend between leg elements 34 of connecting portion 28' and which are bounded by shaded portions 66 of each polar region 26''' and inner surface 33 of yoke member 22. If still further shading action is needed, a plurality of single turn, short-circuited shading coils 70 may be respectively provided embracing folded sections 68 of connecting portions 28'.

Referring now to FIG. 11, there is shown an embodiment similar to that shown in FIG. 4 wherein each pole portion or tooth 26' comprises a plurality of separate ferro-magnetic flat segments 30'. Here, however, generally U-shaped connecting portions 28' are inverted with respect to connecting portions 28 shown in FIG. 4 so that connecting elements 36" are adjacent bore 40. One or more of a plurality of openings 72 are preferably respectively formed in connecting elements 36". In one embodiment, openings 72, such as holes 0.0625 inches in diameter, were spaced 0.125 inches center-to-center.

A pair of distal ends or, portions 74 project from leg elements 34 of connecting portions 28' and are contiguous to inner surface 33 of yoke member 22, respectively. Projecting portions 74 initially form extensions of leg portions 34, as shown in dashed lines at 74a. After assembly of teeth 26' the positioning of windings (not shown) but similar to the aforementioned windings 60 in winding slots 42, portions 74a are folded to the position shown in solid lines thus compacting the windings in slots 42, and the pole structure is then assembled within yoke member 22.

Referring now to FIGS. 12 and 13, a motor, generally identified at 76, is provided comprising yoke member 22 and pole structure or polar region defining structure 24' of the type shown in FIG. 11. Appropriate field windings, shown in dashed lines at 78, are positioned in slots 42 defined by teeth 26'. Conventional rotor member 80 mounted on shaft 82 is rotatably positioned in bore 40.

Shaft 82 is rotatably mounted in bearings 84 respectively supported in bearing support members 86. Bearing support members 86 have surface portions 88 received in opposite ends of bore 40 and respectively engaging flat segments 30' of pole structure 24'.

Bearing support members 86 have a plurality of radially outwardly extending projections 92 formed thereon which extend between respective pairs of leg elements 34. Leg elements 34 extend axially the same length as ferro-magnetic flat segments 30' and bearing support members 86 engage flat segments 30'.

It will be seen that the construction shown in FIGS. 12 and 13 provides a motor assembly which does not include an outer shell or frame and end shields.

In one actual reduction to practice, test results were obtained on a motor constructed as illustrated in FIG. 12 and compared to a comparable motor of conventional design.

|  | Conventional Motor | Scrapless Motor |
|---|---|---|
| Starting Torque (oz.-ft.) | 7.13 | 6.38 |
| Breakdown Torque (oz.-ft.) | 17.9 | 17.5 |
| Torque Speed (RPM) | 1071 | 1071 |
| Power Out-Mech. (Watts) | 118.8 | 118.8 |
| Power In-Elect. (Watts) | 226 | 220 |
| Efficiency (%) | 52.5 | 53.9 |
| Power factor | 0.923 | 0.882 |

It will thus be appreciated that scrapless stator assemblies embodying my invention and formed of flat strip material are very competitive in performance when compared to a comparable conventionally constructed stator. A significant amount of scrap inherently results from the construction of a conventional stator.

It will be appreciated that utilization of my teachings in stator design will allow greater flexibility in the choice of materials to be used in constructing a dynamoelectric machine. For example, in a conventional motor design, a stator lamination comprising a yoke and teeth portions is punched out of a strip of material; and, in order to reduce the amount of scrap, the rotor laminations are made from scrap left over from the stator bore hole. Therefore, one type of material is used for the entire stator structure, and the same material is used for a rotor structure. However, by following my teachings, the yoke may be a different material than the tooth material, and the rotor may be constructed from yet another material. It can therefore be appreciated that, where practical, less expensive material can be used.

It will now be seen that I have taught how to provide a scrapless stator assembly in which the yoke member comprises an elongate, coiled ferro-magnetic element, either flat strip or wire, and in which the pole or tooth structure may be formed from flat, strip ferro-magnetic material. While aspects of the invention have been shown as being embodied in a stator assembly having a central bore, it will be readily understood that a rotor assembly or inside-out stator assembly can be provided employing similarly fashioned structural elements.

As will now be understood, the basic or conventional form of motor construction prevalent since birth of the induction motor is not necessarily the only or even the best construction possible. The conventionally constructed motor is highly developed but inherently subject to serious limitations, particularly economy of material. My invention provides a new starting point with an entirely new set of design freedoms and new cost reduction opportunities.

While there have been described above the principles of this invention in connection with specific apparatus, it is to be clearly understood that this description is made only by way of example and not as a limitation to the scope of the invention.

What I claim as new and desire to secure by Letters Patent of the United States is:

1. A stator assembly for a dynamoelectric machine comprising a yoke member formed of a continuous strip of ferro-magnetic material and having an inner surface facing toward a bore; a plurality of spaced teeth extending generally axially along and inwardly from the inner surface and having inner ends defining the bore, each of the teeth having a plurality of generally axially and inwardly extending ferro-magnetic flat segments; and connecting portions respectively positioned between adjacent ones of the teeth, each of the connecting portions including a pair of leg elements respectively forming parts of the adjacent teeth, and a bight portion between the leg elements and disposed adjacent the bore; the teeth and connecting portions providing a plurality of coil winding slots open adjacent the yoke.

2. A stator assembly for a dynamoelectric machine comprising a yoke member formed of a continuous strip of ferro-magnetic material and having an inner surface facing toward a bore, and a plurality of spaced polar region defining structures extending generally axially along and inwardly from the inner surface and having inner ends defining the bore, a first portion of each polar region defining structure being constituted generally by another continuous strip of ferro-magnetic material having a plurality of first leg elements integrally joined by folds at the inner surface and the bore to establish a first reluctance characteristic, and a second portion of each polar region defining structure formed separately from said first portion and disposed immediately adjacent thereto, said second portion including a plurality of second leg elements having edges at the bore to establish a second reluctance characteristic; the reluctance characteristic of the polar region defining structures being determined at least in part by the extent of such folds and such edges along the bore.

3. A stator assembly as set forth in claim 2, further comprising a plurality of bight portions respectively connected between the first and second portions of adjacent ones of the polar region defining structures.

4. A stator assembly as set forth in claim 3 wherein each bight portion includes a plurality of third leg elements disposed adjacent and extending generally along an end one of the first leg elements in the first portions of each polar region defining structure for shading association with the first portion.

5. A stator assembly for a dynamoelectric machine comprising a yoke member formed of a first strip of ferro-magnetic material and having a generally cylindric inner surface; a plurality of spaced teeth extending generally axially along and inwardly from the inner surface and having inner ends defining a bore, the teeth being formed from a second strip of ferro-magnetic material and having all parts thereof disposed generally within the inner surface, each of the teeth having a plurality of axially and inwardly extending ferro-magnetic flat segments; said second strip of ferro-magnetic material also providing a bight portion respectively connected between a pair of the segments of adjacent ones of the teeth.

6. A stator assembly for a dynamoelectric machine comprising: a yoke member formed of a first strip of ferro-magnetic material and having an inner surface, a plurality of teeth spaced around the inner surface and formed from a continuous second strip of ferro-magnetic material and having all parts thereof disposed generally within the inner surface, the teeth having inner ends defining a bore, and a winding slot between each of adjacent teeth and open adjacent the bore.

7. The assembly of claim 6 wherein the teeth are unequally spaced so that some of the winding slots are wider than others of the slots.

8. The assembly of claim 6 wherein the teeth are generally constituted by a plurality of generally flat ferro-magnetic segments.

9. The assembly of claim 6 wherein the teeth include a pole tip member extending from a tooth and partially closing an adjacent winding slot.

* * * * *